United States Patent [19]
Jordens et al.

[11] Patent Number: 4,834,348
[45] Date of Patent: May 30, 1989

[54] TWO CHAMBER SUPPORT BEARING WITH HYDRAULIC DAMPING

[75] Inventors: Ernst-Günter Jordens, Damme; Johannes Sprute, Osnabrück, both of Fed. Rep. of Germany

[73] Assignee: Firma Lemfoerder Metallwaren AG, Fed. Rep. of Germany

[21] Appl. No.: 180,716

[22] Filed: Apr. 4, 1988

Related U.S. Application Data

[63] Continuation of Ser. No. 921,355, Oct. 20, 1986, abandoned.

[30] Foreign Application Priority Data

Oct. 24, 1985 [DE] Fed. Rep. of Germany ....... 3537865

[51] Int. Cl.⁴ .......................... F16F 5/00; F16F 9/06; F16M 7/00
[52] U.S. Cl. ..................................... 267/140.1; 267/141
[58] Field of Search ...................... 267/140.1, 141, 35, 267/62.27, 217, 219, 259; 248/562, 636; 180/300, 312; 188/320

[56] References Cited

U.S. PATENT DOCUMENTS

| | | | |
|---|---|---|---|
| 3,130,965 | 4/1964 | Niclas | 267/64.27 |
| 4,418,895 | 12/1983 | Bertin et al. | 267/140.1 |
| 4,502,575 | 3/1985 | Fukushima et al. | 188/320 X |
| 4,632,370 | 12/1986 | Ticks et al. | 267/140.1 X |
| 4,651,980 | 3/1987 | Morita et al. | 267/140.3 X |
| 4,657,227 | 4/1987 | Hofmann | 267/140.1 X |
| 4,657,232 | 4/1987 | West | 267/35 X |
| 4,660,812 | 4/1987 | Dan et al. | 267/140.1 |

FOREIGN PATENT DOCUMENTS

| 2844424 | 4/1980 | Fed. Rep. of Germany ... 267/140.1 |
|---|---|---|
| 2906282 | 8/1980 | Fed. Rep. of Germany ... 267/140.1 |

Primary Examiner—Andres Kashnikow
Assistant Examiner—Richard Potosnak
Attorney, Agent, or Firm—McGlew & Tuttle

[57] ABSTRACT

A support bearing with fluid damping in a housing which includes two chambers which are of variable volume and filled with a fluid, and are interconnected by a passage with a built-in restrictor valve. The housing includes rubber-elastic inner and outer walls of different degrees of hardness which are fastened to metallic support members. One of the supports is connected with the foundation and the other with the part (engine) to be supported. One chamber surrounds the other chamber circularly and a passage interconnects the chambers. The walls defining the chambers are incorporated in a housing connected to a support member. The elements comprises a rubber-elastic material and are formed in one piece and are firmly connected with the one supporting member, as well as with a support ring, which is advantageously connected with the other supporting member by mechanical means.

3 Claims, 2 Drawing Sheets

TWO CHAMBER SUPPORT BEARING WITH HYDRAULIC DAMPING

This application is a continuation of application Ser. No. 921,355, filed Oct. 20, 1986, now abandoned.

FIELD AND BACKGROUND OF THE INVENTION

This invention relates in general to resilient supporting bearings and in particular to a new and useful support bearing having two fluid chambers particularly for the support of an engine in an autombobile.

The German Pat. No. 3,225,700 and the German Offenlegungsschrift 3,244,296 each describe two-chamber support bearings. For these known support bearings, an upper supporting member for attachment to the crankcase of the engine and a lower supporting member for attachment to a foundation, such as the body of a motor vehicle, are connected together by a spring element of rubber. The space below the spring element is provided with a partition which divides an upper chamber, acting as a working space, from a lower chamber, which assumes the function of an equalizing chamber, the walls are at least partly rubber-elastic in nature, so that the two chambers can change their volume. The partition has a connecting passage with a restrictor valve. In the construction of the German Pat. No. 3,225,700, this connecting passage is disposed ring-shaped in the partition. On the other hand, the German Offenlegungsschrift 3,244,296 has a straight, connecting passage between the upper chamber and the lower chamber. With this arrangement, a further, air-filled chamber is separated by a membrane for the purpose of a hydraulic decoupling of high frequencies in the upper chamber (working space). This membrane chamber is disposed centrally in the upper supporting member. This membrane also consists of rubber, the hardness of which, however, is different from that of the rubber-elastic wall of the lower chamber (equalizing space). In the event of oscillations of small amplitude, and exchange of fluid between the two chambers is largely prevented by the response of this membrane, so that an acoustic isolation of these oscillations is achieved.

SUMMARY OF THE INVENTION

The invention provides a two-chamber support bearing with the number of individual components and the cost of their manufacture being reduced for the purpose of rationalizing the manufacturing process without changing advantageous characteristics.

The inventive construction permits the components of a two-chamber support bearing with hydraulic damping to be reduced essentially to the upper supporting member, the lower supporting member and a spring body of rubber or a different elastic material with comparable properties, which connects these two elements. The central chamber forms the working space, while the equalizing space is integrated as a chamber in the spring body of rubber. Likewise, the passage connecting the two chambers is integrated in one of the two supporting members, advantageously in the lower supporting member, which can be connected with the foundation, for example, the body of a motor vehicle. In a preferred embodiment, the passage between the two chambers is, however, formed by the supporting member which is fastened to the foundation, and by a support ring, which is connected tightly with the rubber-elastic spring body at the edge of the wall enclosing the inner chamber by vulcanization and with the supporting member. The spring body with its two skirt-like projections forming the walls of the two chambers is firmly connected by vulcanization in one working step with the upper supporting member and the support ring. The rubber-elastic wall, which encloses the ring-shaped outer chamber (equalizing chamber) on the outside, is advantageously formed in one piece with the rubber-elastic wall of the inner chamber (working space) and firmly connected by vulcanization with the upper supporting member as well as with the supporting ring. Moreover, the rubber-elastic wall of the outer chamber is fashioned as a skirt-like casing, the lower edge of which can be fastened tightly by holding means to the lower supporting element. The invention provides that this lower edge of the outer, rubber-elastic wall can mesh as a seal between the support ring and the supporting member.

Aside from advantages with respect to reducing the manufacturing expense compared to the known designs and aside from a compact construction, the two chamber support bearing with the inventive structural characteristics is particularly suitable for use as an acoustic uncoupling device for oscillations of small amplitude within the upper supporting member. The invention provides that this uncoupling device comprises a membrane disposed within the upper supporting member between two perforated plates with a definable clearance. To achieve optimum effect, this membrane can work against the atmospheric outside pressure or against a specified pressure above atmospheric. In this connection, the cross-sectional shape is adapted to local conditions and may be rectangular, biconcave or biconvex.

Accordingly it is an object of the invention to provide a support bearing which includes a substantially semi-spherically shaped outer and inner walls having inner and outer peripheries which are connected respectively to the hub portion and a plate portion and in which there is an inner chamber defined between the inner and outer walls and a passage between the inner and outer chambers which has a valve or other restriction therein.

A further object of the invention is to provide a support bearing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
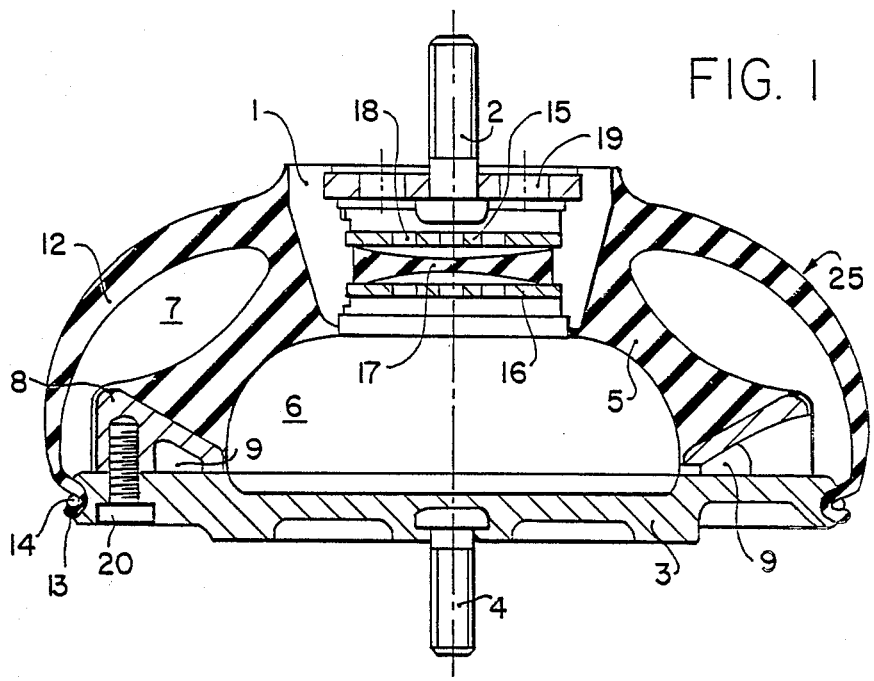
FIG. 1 is a vertical sectional view through a two-chamber support bearing constructed in accordance with the invention.

Referring to the drawings in particular the invention embodied therein comprises a support bearing whch in the embodiment illustrated includes a housing generally designated 25 having an inner wall or a spring body 5 and an outer wall or skirt portion 12 which are closed at their outer peripheries by a first support member 3 and at their inner peripheries by an upper second support member or hub 1 and define an inner chamber 6 an an outer chamber 7.

Figure 2:
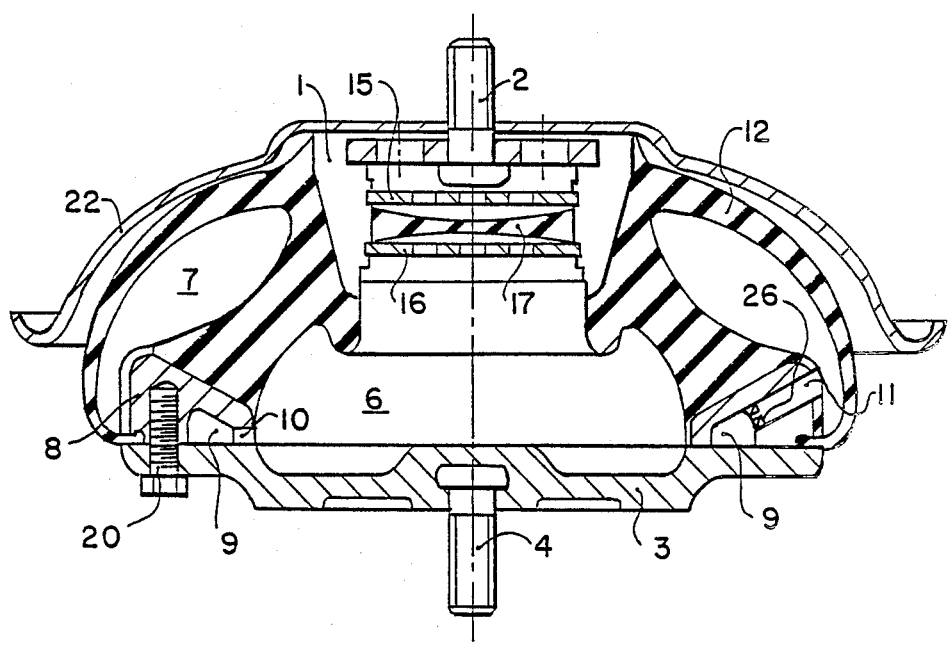
FIG. 2 is a similar view of a modified embodiment of the invention.

The two-chamber support bearing comprises the upper supporting member or hollow sleeve 1 with the attachment means 2 for attachment to the crankcase of an engine or the like, lower supporting member 3 with the attachment means or plug 4 for attachment to a foundation, such as the body of a motor vehicle and a spring body portion or inner wall 5 of rubber or a different elastic material with comparable properties. These components, including an outer wall or skirt 12 are part of a generally spherical housing 25, enclose an inner chamber 6 and an outer chamber 7, which surrounds the inner chamber 6 circularly. A support ring 8 is connected to the lower supporting member 3, and the ring, together with the supporting member 3, encloses a circular passage 9 having an outlet 10 extending into the inner chamber 6 which is directed approximately horizontally. The passage 9 also has another outlet 11 which extends into the outer chamber 7 and is directed approximately vertically. (FIG. 2). At a convenient place in passage 9, a blocking element or valve 26 is inserted, which partially or completely blocks the passage cross section, so that the length of the passage between the outlet 10 and the outlet 11 can be fixed.

At its upper end, the spring body 5 is provided with a skirt portion 12, which forms another wall of the outer chamber 7. The lower edge 13 of the skirt 12 can be connected tightly and firmly with the lower supporting member 3. By way of example, it is shown in FIG. 1 that the edge 13 of the skirt 12 is inserted in a channel at the periphery of the lower supporting member and held by a steel ring 14 or the like.

To decouple oscillations of small amplitudes, a membrane 17 of an elastic material is disposed with a defined clearance in the upper supporting member 1 between two perforated plates 15 and 16. To achieve an optimum effect, this membrane 17 may work because of vent bores 18 and 19 against atmospheric outside pressure or a pressure higher than atmospheric. As the oscillation amplitudes increase, the membrane 17 lies against the upper or the lower plate, so that the fluid from the central chamber 6, forming the working space, is displaced into the passage 9. The flow resistance of the passage is less than the buckling stiffness of the spring body 5 surrounding the lower large working space in the chamber 6. Through the passage, the fluid reaches the outer chamber 7, which forms the equalizing space and which, in the construction of the invention, is located between the skirt portion 12 and the exterior of the spring body portion 5. Due to the stiffness of the material of the spring body portion 5 as well as due to the resistance of the passage 9, the phase angle increases with increasing frequency. If the buckling stiffness of the material of the spring body 5, however, becomes less than the resistance of the flow passage, the damping decreases and gradually, at higher frequencies, changes over almost to the specific damping of the material of the spring body 5.

Figure 3:
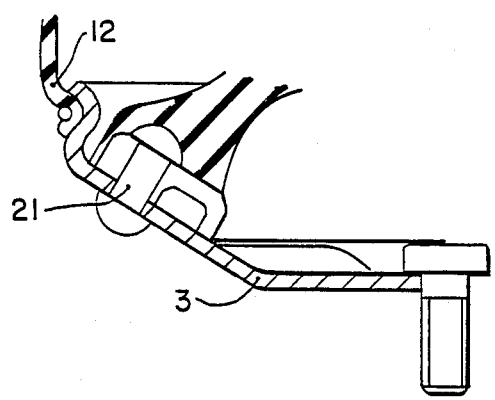
FIGS. 3, 4, and 5 are similar views of other embodiments showing variations of the attachment of the spring body to the support ring, as well as the construction of this ring and its connection with the lower supporting member.
Figure 4:
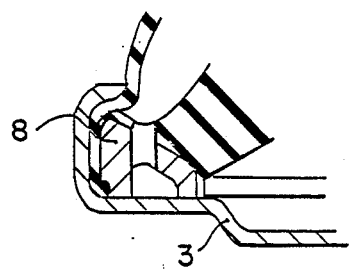

As is evident from the embodiments of FIGS. 1 and 2, the spring body portion 5 is formed in one piece with the skirt portion 12 in a housing 25 which is firmly connected with the upper supporting member 1 as well as with the support ring 8 by vulcanization. This vulcanization process takes place in one working step, so that, compared to the known constructions, a reduced number of components as well as lower manufcturing costs are achieved. According to the examples of FIGS. 1 and 2, the support ring 8 is connected with the lower supporting member 3 by means of screws 20. This connection may, however, also be replaced by a rivetted joint 21 (FIG. 3). The embodiment in FIG. 4 shows the connection of the individual components of the two-chamber support bearing by flanging. The construction of the lower supporting member 3 is shown with a broadened edge, which is rolled around the support ring 8, including he edge 13 of the skirt-shaped projection 12. With this arrangement also, the edge 13 of the skirt-shaped projection 12 forms the seal between the lower supporting member 3 and the support ring 8.

Figure 5:
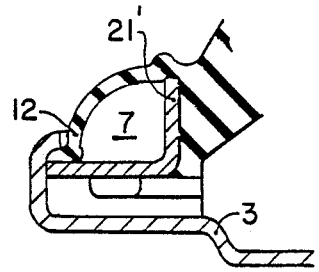

FIG. 5 finally shows an embodiment, in which the outer chamber 7 of ring-shaped construction has a relatively small cross-section, which is, however, adapted to the volume of working chamber 6, which is displaced by static spring deflection, and is formed together with a profile or sheet-metal ring 21' (which has the function of the support ring 8) and of the skirt portion 12. In this example also, the skirt portion 12 is clamped with its edge 13 between the profile 21 and the edge of the lower supporting member 3.

Finally, it should be pointed out that the rubber-elastic material of the skirt-shaped projection 12 can be protected by a metallic protective covering 22 against mechanical damage, this protective cap 22 being clamped between the upper supporting member 1 and the crankcase of the engine or the like.

While specific embodiments of the invention have been shown and described in detail to illustrate the application of the principles of the invention, it will be understood that the invention may be embodied otherwise without departing from such principles.

What is claimed:
1. A support bearing comprising:
   a substantially hemispherically shaped outer wall having an inner periphery forming a central circular opening, said outer wall being of a first hardness;
   a substantially hemispherically shaped inner wall having an inner periphery forming a central circular opening, said outer wall being connected to said inner wall at said central opening, said inner wall being of a second hardness different from the hardness of said first wall;
   a support member, said inner and outer wall each having an outer periphery at an end substantially opposite said inner and outer wall central opening, said support member being connected to the outer periphery of each of said outer and inner wall defining an inner chamber between said inner wall and said support member and an outer chamber between said inner wall and said outer wall;
   an upper support hub construction including an upper support hub connected to and vulcanized to the inner peripheries of said inner and outer walls, a first perforated plate supported by said upper sup- port hub, a second perforated plate supported by said upper support hub and a membrane formed of elastic material positioned between said first and second perforated plates, said membrane being acted on by atmospheric pressure through said first perforated plate and being acted on by pressure within said inner chamber through said second perforated plate; and, means defining a restricted passage between said inner and outer chambers.

2. A support bearing according to claim 1, wherein: said means defining a restricted passage between said outer and inner chambers includes a ring having a surface engaged on said support member and defining a circular passage with said support member.

3. A support bearing, comprising an integral member of a substantially hemispherically shaped outer wall and an substantially hemispherically shaped inner wall, a support plate connected to an outer periphery of said outer and inner walls and defining an inner chamber between said inner wall and said support plate, an outer chamber between said inner wall and said outer wall, an upper support hub connected to the inner peripheries of said inner and outer walls, and means defining a restricted passage between said inner and outer chambers said inner and outer walls comprising a single integral housing of elastic material being vulcanized to the upper support hub, said outer wall being secured to the periphery of said support member, a ring engaged around the periphery of said outer wall portions, said support member having an edge with a recess into which said ring engages over said outer wall portion, said means defining a restricted passage between said outer and inner chambers being a second ring having a surface engaged on said support member and defining a circular passage with said support member and wherein the outer and inner wall portions are of different hardness.

* * * * *